United States Patent
Yasuda (10) Patent No.: US 9,718,385 B2
(45) Date of Patent: Aug. 1, 2017

(54) VEHICLE SEAT

(71) Applicant: NHK SPRING CO., LTD., Yokohama-shi (JP)

(72) Inventor: Kenzo Yasuda, Yokohama (JP)

(73) Assignee: NHK SPRING CO., LTD., Yokohama-shi (JP)

( * ) Notice: Subject to any disclaimer, the term of this patent is extended or adjusted under 35 U.S.C. 154(b) by 0 days.

(21) Appl. No.: 14/721,984

(22) Filed: May 26, 2015

(65) Prior Publication Data

US 2015/0343929 A1    Dec. 3, 2015

(30) Foreign Application Priority Data

May 27, 2014  (JP) ................ 2014-109500

(51) Int. Cl.
| | | |
|---|---|---|
| B60N 2/64 | (2006.01) | |
| B60N 2/68 | (2006.01) | |
| B29C 44/04 | (2006.01) | |
| B29C 44/12 | (2006.01) | |
| B29L 31/58 | (2006.01) | |

(52) U.S. Cl.
CPC .......... *B60N 2/646* (2013.01); *B29C 44/0461* (2013.01); *B29C 44/1228* (2013.01); *B60N 2/68* (2013.01); *B60N 2/686* (2013.01); *B29L 2031/58* (2013.01)

(58) Field of Classification Search
CPC .......... B60N 2/646; B60N 2/686; B60N 2/68; B29C 44/04; B29C 44/18; B29C 44/1228
USPC .................................................. 297/452.18
See application file for complete search history.

(56) References Cited

U.S. PATENT DOCUMENTS

| | | | | |
|---|---|---|---|---|
| 5,988,757 A | * | 11/1999 | Vishey .................. | B60N 2/23 297/452.18 |
| 8,807,654 B2 | * | 8/2014 | Funk ...................... | B29C 44/18 297/452.18 |
| 2007/0176480 A1 | | 8/2007 | Brunner | |
| 2013/0257119 A1 | * | 10/2013 | Roberts ................ | B60N 2/427 297/452.18 |
| 2014/0084662 A1 | | 3/2014 | Zekavica et al. | |

FOREIGN PATENT DOCUMENTS

| | | |
|---|---|---|
| JP | 2003-070588 A | 3/2003 |
| WO | WO 95/13938 A1 | 5/1995 |
| WO | WO 2008/121754 A1 | 10/2008 |

OTHER PUBLICATIONS

Extended European Search Report issued Oct. 9, 2015 in corresponding EP Application No. 15168454.5.

* cited by examiner

*Primary Examiner* — Anthony D Barfield
(74) *Attorney, Agent, or Firm* — Knobbe Martens Olson & Bear LLP (57) ABSTRACT

There is provided a vehicle seat including a seatback frame including: a first base member formed of a thin plate member made of resin; a second base member formed of a thin plate member made of resin and disposed facing the first base member; a pass-through portion that is formed to at least one of the first base member or the second base member, and that enables insertion of an injection nozzle for injecting a foaming liquid for a foamed body; and a core section that is configured by the foamed body, that is disposed between the first base member and the second base member, and that is adhered to the first base member and the second base member.

7 Claims, 7 Drawing Sheets

FIG.6

VEHICLE SEAT

CROSS-REFERENCE TO RELATED APPLICATION

This application is based on and claims priority under 35 USC 119 from Japanese Patent Application No. 2014-109500 filed on May 27, 2014, the disclosure of which is incorporated by reference herein.

BACKGROUND

Technical Field

The present invention is related to a vehicle seat.

Related Art

US Patent Application Publication No. 2014/0084662 describes an invention relating to a vehicle seat. In the vehicle seat, a single thin plate member (steel member) is processed to form a seatback frame, enabling a uniform rigidity to be imparted to the seatback frame, while suppressing an increase in weight of the seatback frame.

However, in the case of the related art described in US Patent Application Publication No. 2014/0084662, the seatback frame is configured of a single steel member, and the thickness of the seatback frame itself needs to be increased in order to further improve the rigidity of the seatback frame. It is therefore difficult to improve rigidity of the seatback frame while suppressing an increase in the weight of the seatback frame.

SUMMARY

In consideration of the above circumstances, an object of the invention is to obtain a vehicle seat capable of suppressing an increase in weight due to improving rigidity, while improving rigidity.

A first aspect of the present invention provides a vehicle seat including a seatback frame including:

a first base member formed of a thin plate member made of resin;

a second base member formed of a thin plate member made of resin and disposed facing the first base member;

a pass-through portion that is formed to at least one of the first base member or the second base member, and that enables insertion of an injection nozzle for injecting a foaming liquid for a foamed body; and a core section that is configured by the foamed body, that is disposed between the first base member and the second base member, and that is adhered to the first base member and the second base member.

A second aspect of the present invention provides the vehicle seat of the first aspect, wherein:

the core section is configured including a first foamed section, and a second foamed section with a higher density than the first foamed section; and the pass-through portion is configured including a first pass-through portion facing the first foamed section, and a second pass-through portion formed at a position separated from the first pass-through portion and facing the second foamed section.

A third aspect of the present invention provides the vehicle seat of the second aspect, wherein the second foamed section is formed at a lower part of the seatback frame and the first foamed section is formed at an upper part of the seatback frame.

A fourth aspect of the present invention provides the vehicle seat of any one of the first through third aspects, wherein:

plural partitioned regions are formed between the first base member and the second base member by a rib portion that protrudes out from at least one of the first base member or the second base member with a leading end portion of the rib portion abutting the other of the first base member or the second base member.

A fifth aspect of the present invention provides the vehicle seat of the third fourth aspect, wherein any of the partitioned regions from out of the plural partitioned regions forms a thinned portion of the core section.

A sixth aspect of the present invention provides the vehicle seat of the fourth aspect, wherein the partitioned region that forms the thinned portion of the core section is formed by a rib section that is a cylindrical shape.

In the first aspect of the present invention, the second base member formed of a thin plate member made of resin is disposed facing the first base member similarly formed of a thin plate member made of resin. The pass-through portion through which an injection nozzle for injecting a foaming liquid for a foamed body can be inserted is formed to at least one of the first base member or the second base member, enabling an injection nozzle to be inserted through the pass-through portion, foaming liquid to be injected through the injection nozzle, and the foamed body to be formed. Thus, the core section configured by the foamed body is disposed between the first base member and the second base member and is adhered to the first base member and the second base member, and the seatback frame is configured as an integral unit including the first base member, the second base member, and the core section.

In cases in which the seatback frame is configured by a single base member alone, the thickness of the seatback frame itself would need to be increased in order to improve the rigidity of the seatback frame. Thus it would be difficult to improve the rigidity of the seatback frame while suppressing an increase in the weight of the seatback frame.

However, in the first aspect of the present invention, the first base member and the second base member are disposed facing each other with the core section interposed therebetween. This enables a secondary moment of a cross-section configured by the base members of the seatback frame to be larger than in cases in which the seatback frame is configured by a single base member having a thickness equal to the sum of the thicknesses of the first base member and the second base member. Thus a greater extent of increase in rigidity of the seatback frame can be achieved accompanying an increase in weight of the base members configuring the seatback frame.

In the second aspect of the present invention, the pass-through portion is configured including the first pass-through portion, and the second pass-through portion formed at a position separated from the first pass-through portion. This enables foaming liquids for urethane foamed bodies each with different densities to be injected through the first pass-through portion and the second pass-through portion, and the urethane foamed bodies configuring the core section can be configured including foamed sections each with different densities, namely, including the first foamed section facing the first pass-through portion and the second foamed section facing the second pass-through portion.

In the second aspect of the present invention, the density of the second foamed section is set higher than the density of the first foamed section. Thus in the foamed bodies configuring the core section, a section at which rigidity is desired can be configured by the second foamed section, and a section at which rigidity is not desired can be configured by the first foamed section.

In the third aspect of the present invention, the second foamed section is formed at a lower part of the seatback frame and the first foamed section is formed at an upper part of the seatback frame.

In the fourth aspect of the present invention, the rib portion protrudes out from at least one of the first base member or the second base member, and the leading end portion of the rib portion abuts the other of the first base member and the second base member. Thus plural partitioned regions are formed between the first base member and the second base member by the rib portion. This enables the core section to be partitioned by the rib section, and enables configuration of the core section to be changed by partitioned region.

In the fifth aspect of the present invention, any one of the partitioned regions from out of the plural partitioned regions forms a thinned portion of the core section. This enables the weight of the core section to be reduced while adhering the first base member and the second base member to the core section.

In the sixth aspect of the present invention, the partitioned region that forms the thinned portion of the core section is formed by a rib section that is a cylindrical shape.

As explained above, the vehicle seat according to the first aspect of the present invention exhibits the excellent advantageous effect of enabling an increase in weight due to improving rigidity to be suppressed, while improving rigidity.

The vehicle seat according to the second aspect of the present invention exhibits the excellent advantageous effect of enabling the rigidity distribution of the seatback frame to be adjusted.

The vehicle seat according to the third aspect of the present invention exhibits the excellent advantageous effect of enabling the rigidity distribution of the seatback frame to be adjusted, as the second aspect.

The vehicle seat according to the fourth aspect of the present invention exhibits the excellent advantageous effect of enabling the rigidity distribution and the balance of weight of the seatback frame to be suitably set.

The vehicle seat according to the fifth aspect of the present invention exhibits the excellent advantageous effect of enabling the weight of the seatback frame to be reduced, while maintaining the rigidity of the seatback frame.

The vehicle seat according to the sixth aspect of the present invention exhibits the excellent advantageous effect of enabling the weight of the seatback frame to be reduced, while maintaining the rigidity of the seatback frame, as the fourth aspect.

BRIEF DESCRIPTION OF THE DRAWINGS

Exemplary embodiments of the present invention will be described in detail based on the following figures, wherein.

DETAILED DESCRIPTION

First Exemplary Embodiment

Explanation follows regarding a vehicle seat 10 of a first exemplary embodiment according to the present invention, with reference to FIG. 1 to FIG. 5. Note that in each of the drawings as appropriate, the arrow FR, the arrow UP, and the arrow LH refer to the front direction, the upward direction, and the left direction, respectively, of the vehicle seat 10. In the present exemplary embodiment, the front direction, the upward direction, and the left direction of the vehicle seat 10 match the front direction, the upward direction, and the left direction of a vehicle installed with the vehicle seat 10.

Figure 5:
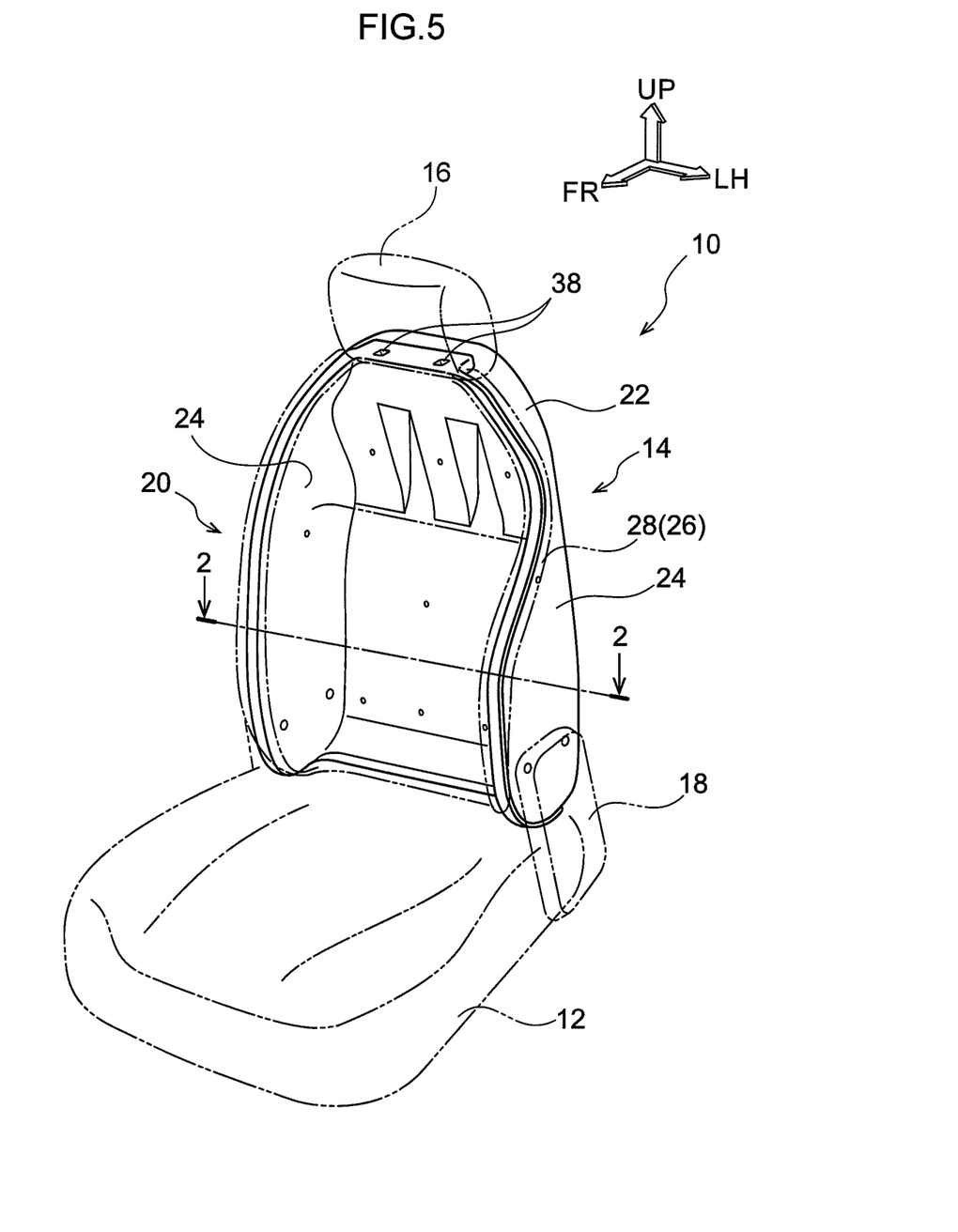
FIG. 5 is a perspective view illustrating a vehicle seat according to the present exemplary embodiment.

Explanation first follows regarding an example of a configuration of the vehicle seat 10 according to the present exemplary embodiment. As illustrated in FIG. 5, the vehicle seat 10 is a front seat installed at the vehicle front side in a vehicle cabin interior of the vehicle. The vehicle seat 10 is configured including a seat cushion 12 supporting the buttocks and thighs of an occupant, a seatback 14 supporting the back of the occupant, and a headrest 16 supporting the head of the occupant.

The seat cushion 12 is configured including a cushion pan, a cushion shell, and a cushion pad, none of which are illustrated in the drawings. The cushion pan, disposed at the seat lower side of the seat cushion 12, is formed of a plate material with a U shaped cross-section, and is configured mountable with a box shaped cushion pad configured of urethane or the like. Note that the cushion pan is coupled to a vehicle body floor through a guide rail or the like, not illustrated in the drawings.

The cushion shell, configured of a plate material that curves such that the seat rear side is indented toward the seat lower side, is disposed at the seat upper side of the cushion pad such that the plate thickness direction runs along the seat up-down direction, and is coupled to the cushion pan through a coupling member, not illustrated in the drawings. An end portion at the seat rear side of the seat cushion 12 is turnably coupled to the seatback 14 through a reclining mechanism 18.

The seatback 14 is configured including a seatback shell 20 acting as a seatback frame, and a cushion member 26. Specifically, the seatback shell 20 is configured including a back shell section 22 and a pair of side shell sections 24, and configures a frame of the seatback 14. The back shell section 22 is formed with its length direction along the seat up-down direction, and is configured so as to cover the rear side of an occupant seated in the vehicle seat 10 from the shoulders to the lumbar region of the occupant. The pair of side shell sections 24 extend from both vehicle width direction sides of the back shell section 22 toward the vehicle front side, and are configured to as to cover side portions of the occupant.

The cushion member 26 is configured capable of resilient deformation using a foamed body such as urethane, and is disposed at a front face side of the seatback shell 20. The surface of the cushion member 26 is covered by a cover 28, and a styling face at the seat front side of the seatback 14 is configured by the cover 28.

The seatback shell 20 is provided with a pair of holder sections 38, described later, and a headrest support, not illustrated in the drawings, is inserted into the holder sections 38. The headrest support is configured insertable with headrest stays, not illustrated in the drawings, of the headrest 16, and includes a headrest stay up-down position adjustment means. This enables the support position of the headrest stays in the seat up-down direction to be adjusted, thus also enabling the position of the headrest 16 in the seat up-down direction to be adjusted.

Figure 1:
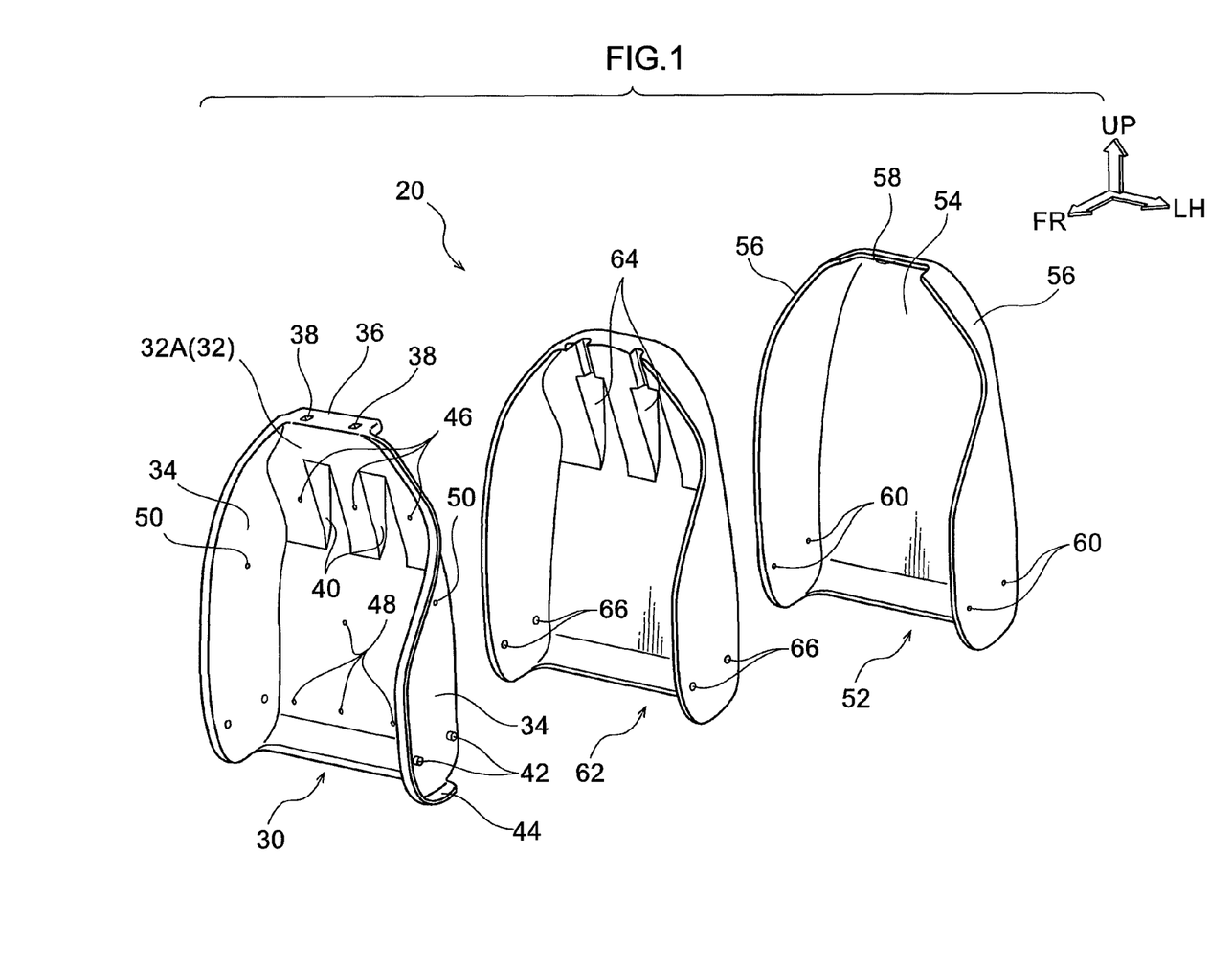
FIG. 1 is an exploded perspective view illustrating a structure of a seatback shell according to a first exemplary embodiment.

As illustrated in FIG. 1, in the present exemplary embodiment, the seatback shell 20 is configured including a first base member 30, a second base member 52, and a core section 62. These members overlap each other as an integral unit in what is referred to as a sandwich structure. Detailed explanation follows regarding a configuration of the seatback shell 20, this being a relevant portion of the present invention.

Figure 3:
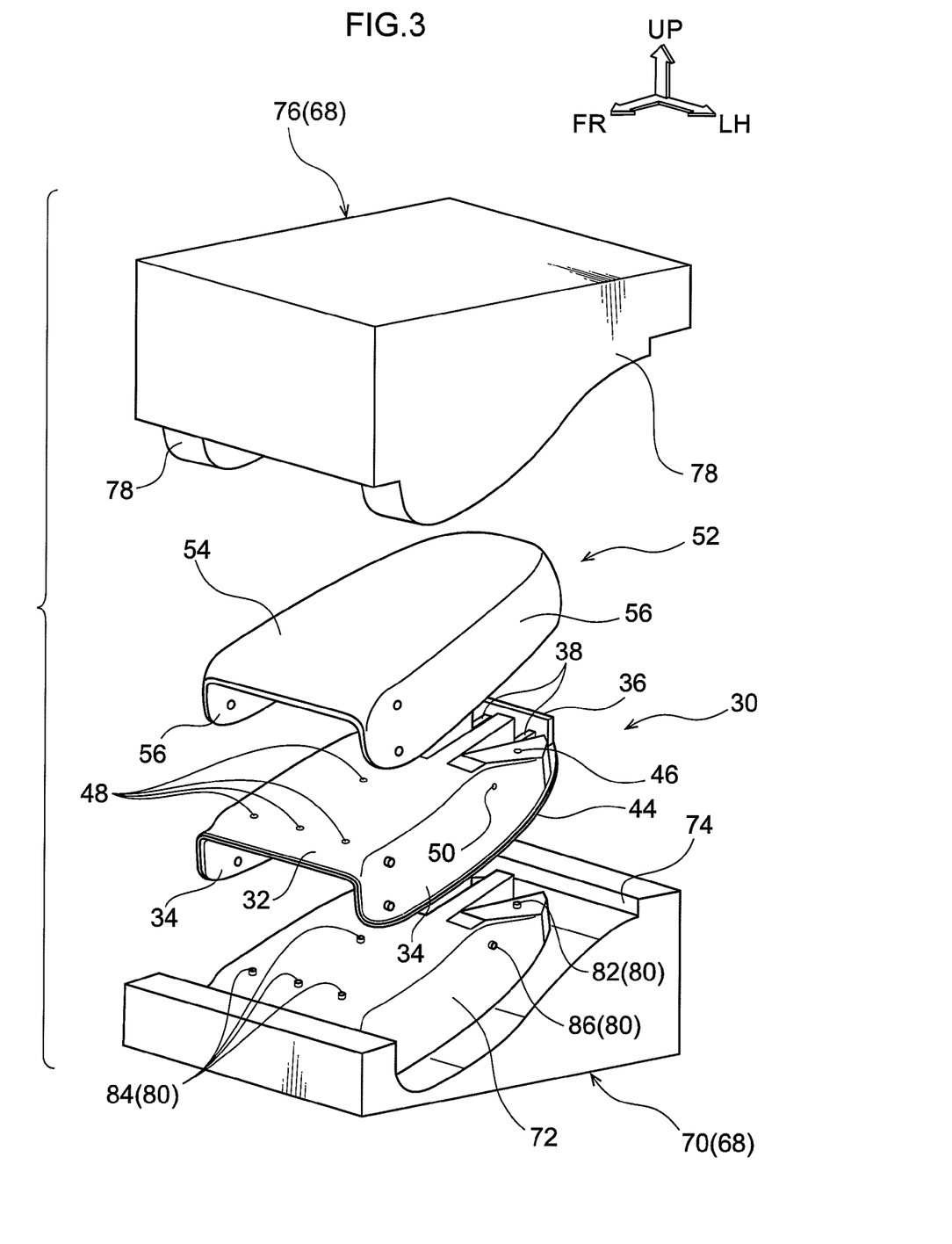
FIG. 3 is a perspective view illustrating a relationship between a first base member and a second base member, and a molding mold, during molding of a seatback shell according to the present exemplary embodiment.

Explanation first follows regarding a configuration of the first base member 30. As an example, the first base member 30 is configured including a rear wall section 32 formed of a thin plate member made of nylon resin and configuring the back shell section 22, and side wall sections 34 configuring the side shell sections 24. As illustrated in FIG. 3, a rectangular plate shaped extension portion 36 is formed extending out at the seat rear side at an upper end portion of the rear wall section 32, and a portion further to the seat upper side than a seat up-down direction center portion of the rear wall section 32 forms a sloped portion 32A sloping from the seat front upper side toward the seat rear lower side. Housing recessed portions 40, in which the holder sections 38 and the headrest stays of the headrest 16 mentioned above are housed, are formed to the sloped portion 32A.

The holder sections 38 are formed in quadrilateral tube shapes with the length directions running along the seat up-down direction, and are disposed separated by an interval so as to be symmetrical with respect to a seat width direction center line. Upper end portions of the holder sections 38 open at the extension portion 36. The housing recessed portions 40 are disposed at seat lower sides of the respective holder sections 38, are configured in rectangular shapes with the length directions running along the seat up-down direction in a front view, and are open at the seat lower side. Lower end portions of the holder sections 38 are open at the seat upper side of the housing recessed portions 40, and the headrest stays can be housed in the housing recessed portions 40 in a state in which the support position of the headrest 16 is set at the seat lower side.

Insert collars (fasteners) 42 are disposed at seat lower sides of the side wall sections 34. A female thread, not illustrated in the drawings, is provided to each of the insert collars 42, and a bolt (fastening member), not illustrated in the drawings, for fastening the seatback shell 20 together with the reclining mechanism 18, is screwed into the female thread. A rim portion 44 running along an edge portion of the first base member 30 is formed to the first base member 30, and the extension portion 36 provided to the rear wall section 32 forms a portion of the rim portion 44.

First pass-through portions 46, second pass-through portions 48, and third pass-through portions 50, through which insertion nozzles 82, 84, 86, described later, are inserted, are formed to the first base member 30. Specifically, one first pass-through portion 46 is disposed between the housing recessed portions 40, and one first pass-through portion 46 is disposed at each of the seat width direction outsides of the housing recessed portions 40, at a seat up-down direction center portion of the sloped portion 32A. Three second pass-through portions 48 are disposed in a row along the seat width direction at the seat lower side of the rear wall section 32, and one second pass-through portion 48 is disposed at a center portion of the rear wall section 32. One third pass-through portion 50 is disposed to each side wall section 34 at a position a specific distance toward the seat upper side from the seat up-down direction center thereof.

As an example, the second base member 52 is formed of a thin plate member made of nylon resin, and is configured including a rear wall section 54 configuring the back shell section 22, and side wall sections 56 configuring the side shell sections 24. The second base member 52 configures a styling face at the seat rear side of the seatback 14. A cutout portion 58, corresponding to the extension portion 36 of the first base member 30, is formed at the seat upper side of the rear wall section 54, and an edge portion of the second base member 52, including a peripheral edge portion of the cutout portion 58, abuts the rim portion 44 of the first base member 30. The rim portion 44 of the first base member 30 and the edge portion of the second base member 52 may be welded together. Hole portions 60, corresponding to the insert collars 42, are formed to the second base member 52.

Figure 2:
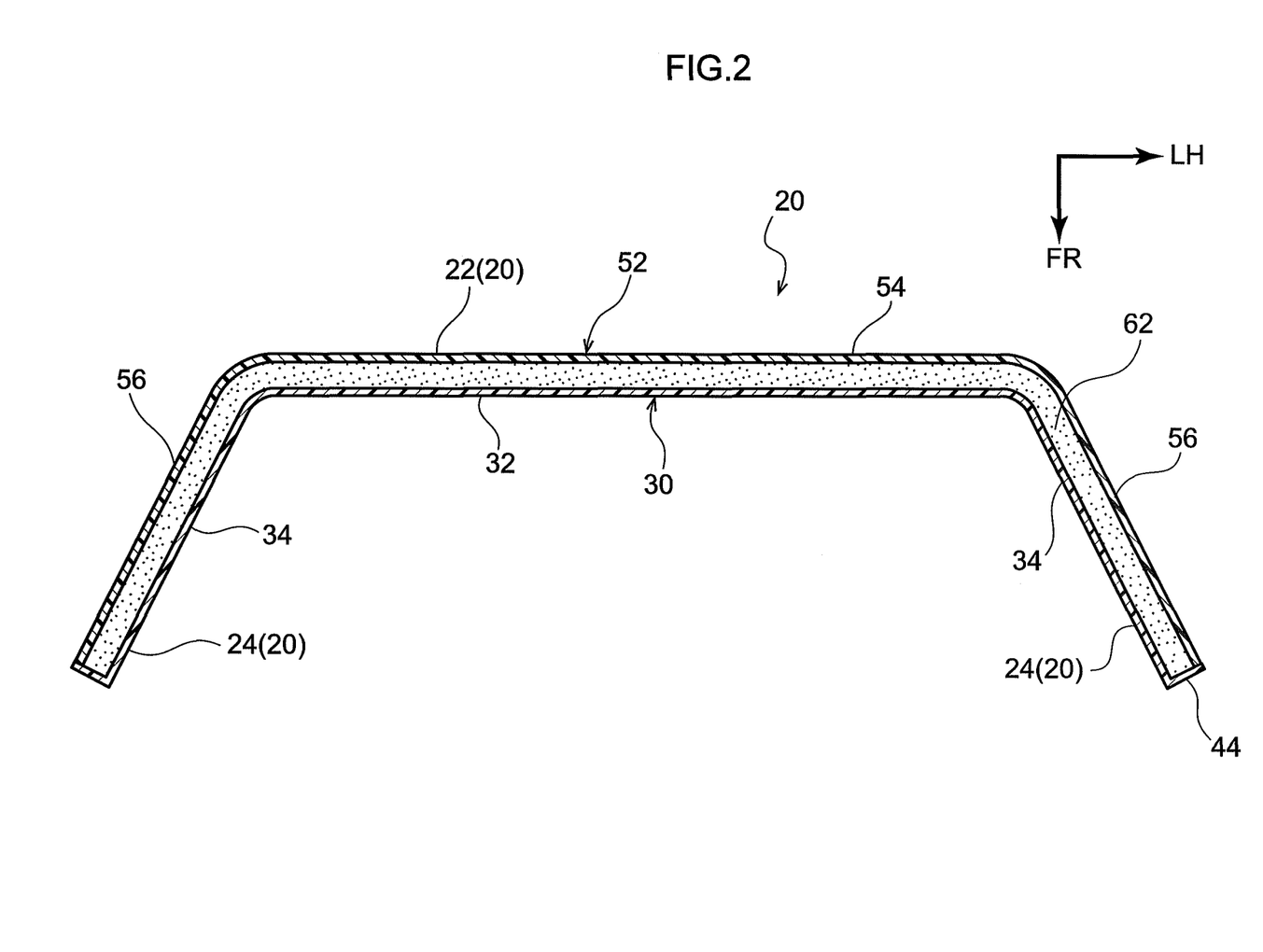
FIG. 2 is an enlarged cross-section illustrating a structure of a seatback shell according to the first exemplary embodiment (a cross-section illustrating a cutaway state taken along line 2-2 in FIG. 5)

As illustrated in FIG. 2, the shape of the second base member 52 is set to be capable of covering the seat rear side of the first base member 30, in a state in which a gap is formed between the second base member 52 and the first base member 30. This enables the core section 62 to be disposed between the first base member 30 and the second base member 52. Note that the first base member 30 and the second base member 52 may be formed by various methods, such as heat pressing or resin transfer molding (RTM).

As an example, the core section 62 is configured by filling in the gap formed between the first base member 30 and the second base member 52 with a urethane foamed body. Namely, although the core section 62 is illustrated in a state separated from the first base member 30 and the second base member 52 in FIG. 1, the core section 62 is in practice adhered to the first base member 30 and the second base member 52. In other words, the core section 62 is formed as an integral unit with the first base member 30 and the second base member 52, thereby configuring the seatback shell 20. Note that recessed sections 64 corresponding to the holder sections 38 and the housing recessed portions 40 of the first base member 30, and hole portions 66 corresponding to the insert collars 42 of the first base member 30, are formed to the core section 62.

In the thus configured seatback shell 20, the rear wall section 32 of the first base member 30 is disposed facing (separated from) the rear wall section 54 of the second base member 52, and the side wall sections 34 of the first base member 30 are disposed facing (separated from) the side wall sections 56 of the second base member 52, each with the core section 62 interposed therebetween. A cross-section profile of the outer shell of the seatback shell 20 configured by the first base member 30 and the second base member 52 forms a U shape open to the seat front side, and forms a closed cross-section structure.

Figure 4:
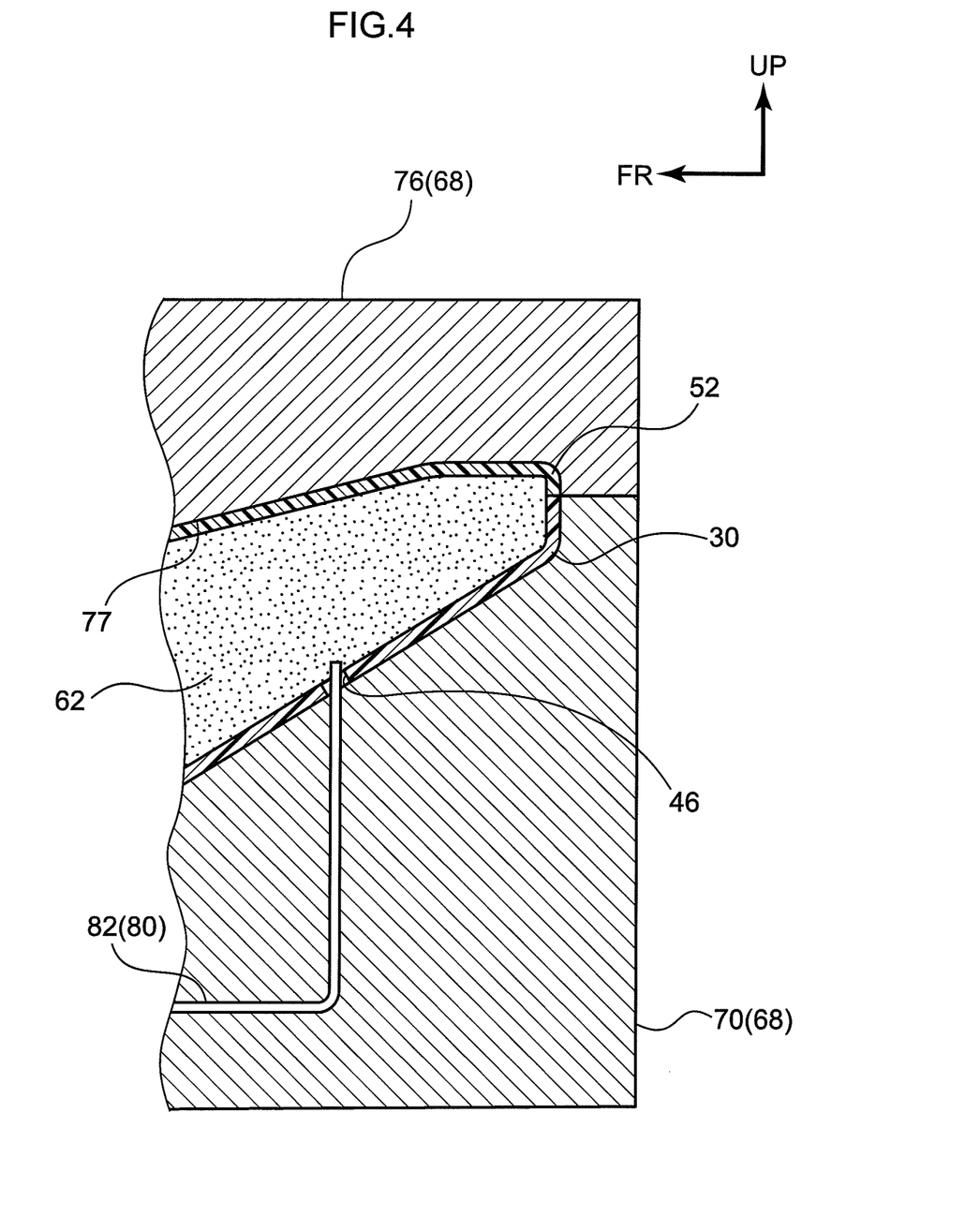
FIG. 4 is an enlarged cross-section illustrating a relationship between a first base member, a second base member, and a molding mold, during molding of a seatback shell according to the present exemplary embodiment.

Explanation follows regarding a method of molding the seatback shell 20 of the present exemplary embodiment, with reference to FIG. 3 and FIG. 4.

First, explanation follows regarding an example of a mold (hereafter simply referred to as "mold") 68 for molding the seatback shell 20. Note that in FIG. 3 and FIG. 4, the arrow FR indicates the mold front direction, the arrow UP indicates the mold upward direction, and the arrow LH indicates the mold left direction, as appropriate. As illustrated in FIG. 3, the mold 68 is configured including a lower mold 70, an upper mold 76 that is mated with the lower mold 70, and a foaming liquid injection section 80 embedded in the lower mold 70.

The upper mold 76 is configured including a recessed section 77 corresponding to the shape of the second base member 52 and into which the second base member 52 can be fitted, and a pair of engagement portions 78 projecting out from both mold width direction sides of the upper mold 76.

The lower mold 70 is configured including a bulging section 72 corresponding to the shape of the first base member 30 and into which the first base member 30 can be fitted, and engaged portions 74 with which the engagement portions 78 of the upper mold 76 engage in a state in which the upper mold 76 is mated with the lower mold 70.

The foaming liquid injection section 80 is configured including piping, not illustrated in the drawings, routed at an inner portion of the lower mold 70, and the injection nozzles 82, 84, 86 branching from the piping. Specifically, the foaming liquid injection section 80 is configured including three injection nozzles 82, four injection nozzles 84, and two injection nozzles 86.

Leading end portions of the injection nozzles 82, 84, 86 protrude out from the surface of the bulging section 72. As illustrated in FIG. 4, in a state in which the first base member 30 is fitted into the bulging section 72 of the lower mold 70, the leading end portions of the injection nozzles 82, 84, 86 are inserted through the first pass-through portions 46, the second pass-through portions 48, and the third pass-through portions 50, respectively. Specifically, the injection nozzles 82, 84, 86 are disposed with the leading end portions of the injection nozzles 82 inserted through the first pass-through portions 46, the leading end portions of the injection nozzles 84 inserted through the second pass-through portions 48, and the leading end portions of the injection nozzles 86 inserted through the third pass-through portions 50.

Next, explanation follows regarding molding processes for molding the seatback shell 20 using the mold 68.

First, in a first process, the first base member 30 is fitted into the bulging section 72 of the lower mold 70, and the second base member 52 is fitted into the recessed section 77 of the upper mold 76. When this is performed, a state is obtained in which the leading end portions of the injection nozzles 82 are inserted through the first pass-through portions 46, the leading end portions of the injection nozzles 84 are inserted through the second pass-through portions 48, and the leading end portions of the injection nozzles 86 are inserted through the third pass-through portions 50. Note that binder is applied to the respective surfaces of the bulging section 72 of the lower mold 70 and the recessed section 77 of the upper mold 76, such that the positions of the first base member 30 and the second base member 52 do not become misaligned.

Next, in a second process, the upper mold 76 and the lower mold 70 are mated with each other such that the engagement portions 78 of the upper mold 76 engage with the engaged portions 74 of the lower mold 70. When this is performed, a state is formed inside the mold 68 in which the edge portion of the first base member 30 abuts the rim portion 44 of the second base member 52, and a space is formed between the first base member 30 and the second base member 52.

Next, in a third process, foaming liquid for the urethane foamed body is injected from the injection nozzles 82, 84, 86 into the space between the first base member 30 and the second base member 52. The injected foaming liquid hardens while foaming and swelling along the first base member 30 and the second base member 52. Thus the space between the first base member 30 and the second base member 52 is filled in with the urethane foamed body, configuring the core section 62 of the seatback shell 20. Note that gas generated due to foaming of air and the foaming liquid in the space between the first base member 30 and the second base member 52 is pressed by the foaming liquid and discharged from the parting line between the first base member 30 and the second base member 52 during the process of swelling of the foaming liquid. Namely, a state occurs in which burrs are formed running along the parting line between the first base member 30 and the second base member 52.

Finally, in a fourth process, the mold is removed after the foaming liquid has hardened, and the molded seatback shell 20 is taken out. The burrs formed running along the parting line between the first base member 30 and the second base member 52 are removed when this is performed. As a fifth process, the edge portion of the first base member 30 may be welded to the rim portion 44 of the second base member 52 if required.

Operation and Advantageous Effects of Present Exemplary Embodiment

Explanation follows regarding operation and advantageous effects of the present exemplary embodiment.

As illustrated in FIG. 1 and FIG. 2, in the present exemplary embodiment, the second base member 52 formed of a thin plate member made of resin is disposed facing the first base member 30 similarly formed of a thin plate member made of resin. Moreover, the first pass-through portions 46, the second pass-through portions 48, and the third pass-through portions 50, through which the injection nozzles 82, 84, 86 for injecting the foaming liquid for the urethane foamed body can be inserted, are formed to the first base member 30. This enables the injection nozzles 82, 84, 86 to be inserted through the first pass-through portions 46, the second pass-through portions 48, and the third pass-through portions 50, the foaming liquid to be injected through the injection nozzles 82, 84, 86, and the urethane foamed body to be formed. Thus the core section 62 configured of the urethane foamed body is disposed between the first base member 30 and the second base member 52, the core section 62 is adhered to the first base member 30 and the second base member 52, and the seatback shell 20 is configured as an integral unit including the first base member 30, the second base member 52, and the core section 62.

In cases in which the seatback shell 20 is configured by a single base member alone, the thickness of the seatback shell 20 itself would need to be increased in order to improve the rigidity of the seatback shell 20. Thus it would be difficult to improve the rigidity of the seatback shell 20 while suppressing an increase in the weight of the seatback shell 20.

However, in the present exemplary embodiment, the first base member 30 and the second base member 52 are disposed facing (separated from) each other, with the core section 62 interposed therebetween. This enables a secondary moment of a cross-section configured by the base members of the seatback shell 20 to be larger than in cases in which the seatback shell 20 is configured by a single base member having a thickness equal to the sum of the thicknesses of the first base member 30 and the second base member 52.

To explain in detail, the cross-section secondary moment of the outer shell of the seatback shell 20 configured by the first base member 30 and the second base member 52 has a larger value than the sum of the individual cross-section secondary moments of the first base member 30 and the second base member 52, due to what is referred to as the parallel axis theorem. Specifically, the cross-section secondary moment of the outer shell of the seatback shell 20 is the sum of (cross-section area of the first base member 30)×(the square of distance from a neutral axis to the first base member 30) and (cross-section area of the second base member 52)×(the square of distance from the neutral axis to the second base member 52), added to the individual cross-section secondary moments of the first base member 30 and the second base member 52. This is one characteristic of a sandwich structure, and this theorem enables a large bending rigidity to be efficiently obtained.

Thus in the present exemplary embodiment, a greater extent of increase in rigidity of the seatback shell 20 can be achieved accompanying an increase in weight of the base member configuring the seatback shell 20. This enables an increase in the weight of the vehicle seat 10 due to improving rigidity to be suppressed, while improving the rigidity of the vehicle seat 10.

According the parallel axis theorem described above, a configuration in which the first base member 30 and the second base member 52 are separated can impart rigidity to the seatback shell 20. However in practice, in cases in which there is space between the first base member 30 and the second base member 52, load would be borne by the first base member 30 or the second base member 52, namely by a thin plate member made of resin, rather than the entire seatback shell 20, when localized load is applied to the seatback shell 20. Namely, in a configuration in which there is space between the first base member 30 and the second base member 52, rigidity with respect to localized load would depend on the individual rigidity of the first base member 30 or the second base member 52 rather than the rigidity of the entire seatback shell 20, and it would be difficult to support the load.

However, in the present exemplary embodiment, the core section 62 configured of the urethane foamed body is disposed between the first base member 30 and the second base member 52. Thus even when localized load is applied to the seatback shell 20, the load is dispersed, and the load can be supported by the entire seatback shell 20. Thus in the present exemplary embodiment, rigidity of the seatback shell 20 with respect to localized load can be secured.

In the present exemplary embodiment, foaming liquid is injected between the first base member 30 and the second base member 52 to configure the core section 62. This enables the manufacturing efficiency of the seatback shell 20 to be improved compared to a case in which plural members configured by urethane foamed bodies are attached to the first base member 30 or the second base member 52 to configure the core section 62.

In cases in which the core section 62 is configured by plural members, these members would sometimes rub against each other, generating noise; however no such noise is generated in the present exemplary embodiment, since the core section 62 is configured by an integral body.

Note that in the present exemplary embodiment, as long as there is at least one of the first pass-through portion 46, the second pass-through portion 48, or the third pass-through portion 50, foaming liquid can be injected through the corresponding nozzle, and the core section 62 can be disposed between the first base member 30 and the second base member 52.

Second Exemplary Embodiment

Figure 6:
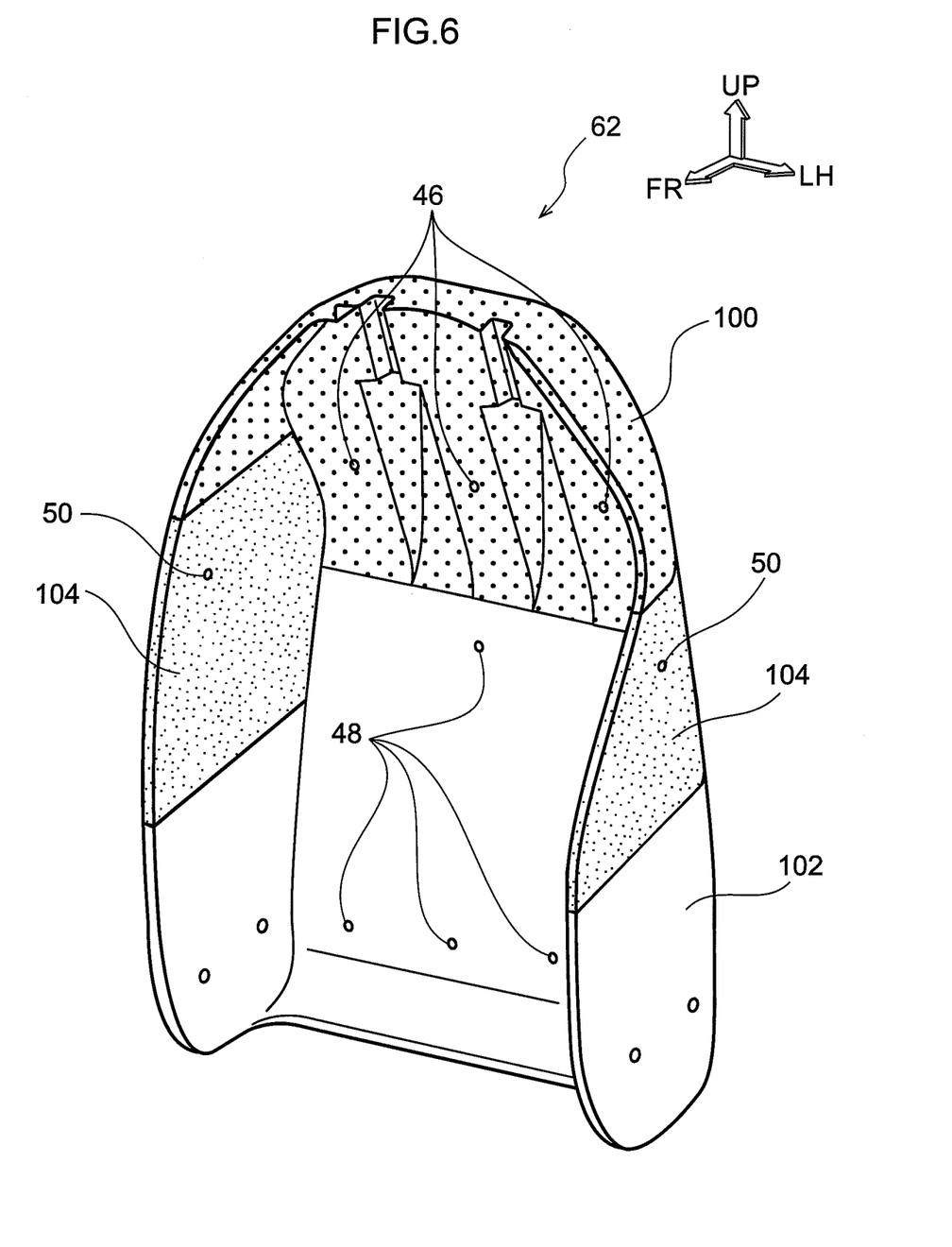
FIG. 6 is a perspective view illustrating a configuration of a core section according to a second exemplary embodiment.

Explanation follows regarding the vehicle seat 10 according to a second exemplary embodiment, with reference to FIG. 6. Note that sections with similar configuration to the first exemplary embodiment described above are appended with the same numerals, and explanation thereof is omitted.

In the second exemplary embodiment, the core section 62 is configured including a first foamed section 100, a second foamed section 102, and third foamed sections 104, each with different densities.

Explanation first follows regarding a molding process of the seatback shell 20 according to the present exemplary embodiment. In the present exemplary embodiment, in the third process of the molding processes of the seatback shell 20, namely, in the process in which foaming liquid is injected into the space between the first base member 30 and the second base member 52, foaming liquids of different densities are injected through the respective injection nozzles 82, 84, 86. Specifically, a low density foaming liquid is injected through the injection nozzles 82, a high density foaming liquid is injected through the injection nozzles 84, and a medium density foaming liquid is injected through the injection nozzles 86.

In the seatback shell 20 molded using the above process, the core section 62 is configured including the first foamed section 100 formed of low density foaming liquid, the second foamed section 102 formed of high density foaming liquid, and the third foamed sections 104 formed of medium density foaming liquid. Note that, comparing the densities, the rigidity of the urethane foamed bodies decreases in rigidity in sequence of the second foamed section 102, the third foamed section 104, and the first foamed section 100.

Explanation follows regarding placement of the first foamed section 100, the second foamed section 102, and the third foamed sections 104. The first foamed section 100 is disposed further toward the seat upper side than a seat up-down direction center of the back shell section 22, and at the seat upper side of the side shell sections 24. The second foamed section 102 is disposed further toward the seat lower side than the seat up-down direction center of the back shell section 22, and at the seat lower side of the side shell sections 24. The third foamed sections 104 are disposed at seat up-down direction center portions of the side shell sections 24. In other words, the third foamed sections 104 are disposed between the first foamed section 100 and the second foamed section 102.

Operation and Advantageous Effects of Present Exemplary Embodiment

Explanation follows regarding operation and advantageous effects of the present exemplary embodiment.

In the present exemplary embodiment, the first pass-through portions 46, and the second pass-through portions 48 disposed at positions separated from the first pass-through portions 46, are formed to the first base member 30. This enables foaming liquids for urethane foamed bodies each with different densities to be injected through the first pass-through portions 46 and the second pass-through portions 48. Thus the urethane foamed bodies configuring the core section 62 can be configured including foamed sections each with different densities, namely, including the first foamed section 100 facing the first pass-through portions 46 and the second foamed section 102 facing the second pass-through portions 48.

In the present exemplary embodiment, the density of the second foamed section 102 is set higher than the density of the first foamed section 100. Thus in the urethane foamed bodies configuring the core section 62, a section at which rigidity is required can be configured by the second foamed section 102, and a section at which rigidity is not required can be configured by the first foamed section 100.

Specifically, the rigidity of the seatback shell 20 can be increased by disposing the second foamed section 102 at the seat lower side of the seatback shell 20, and at a surrounding portion of the insert collars 42 for coupling to the reclining mechanism 18, where load is applied during a vehicle collision or the like.

The low density first foamed section 100 is disposed at the seat upper side of the seatback shell 20 where a large load is not applied, thereby reducing the weight of the seatback shell 20.

Disposing the medium density third foamed sections 104 between the first foamed section 100 and the second foamed section 102 enables a sudden change in rigidity from the seat lower side to the seat upper side of the seatback shell 20 to be suppressed. This enables the rigidity distribution in the seatback shell 20 to be adjusted in the present exemplary embodiment.

Third Exemplary Embodiment

Figure 7:
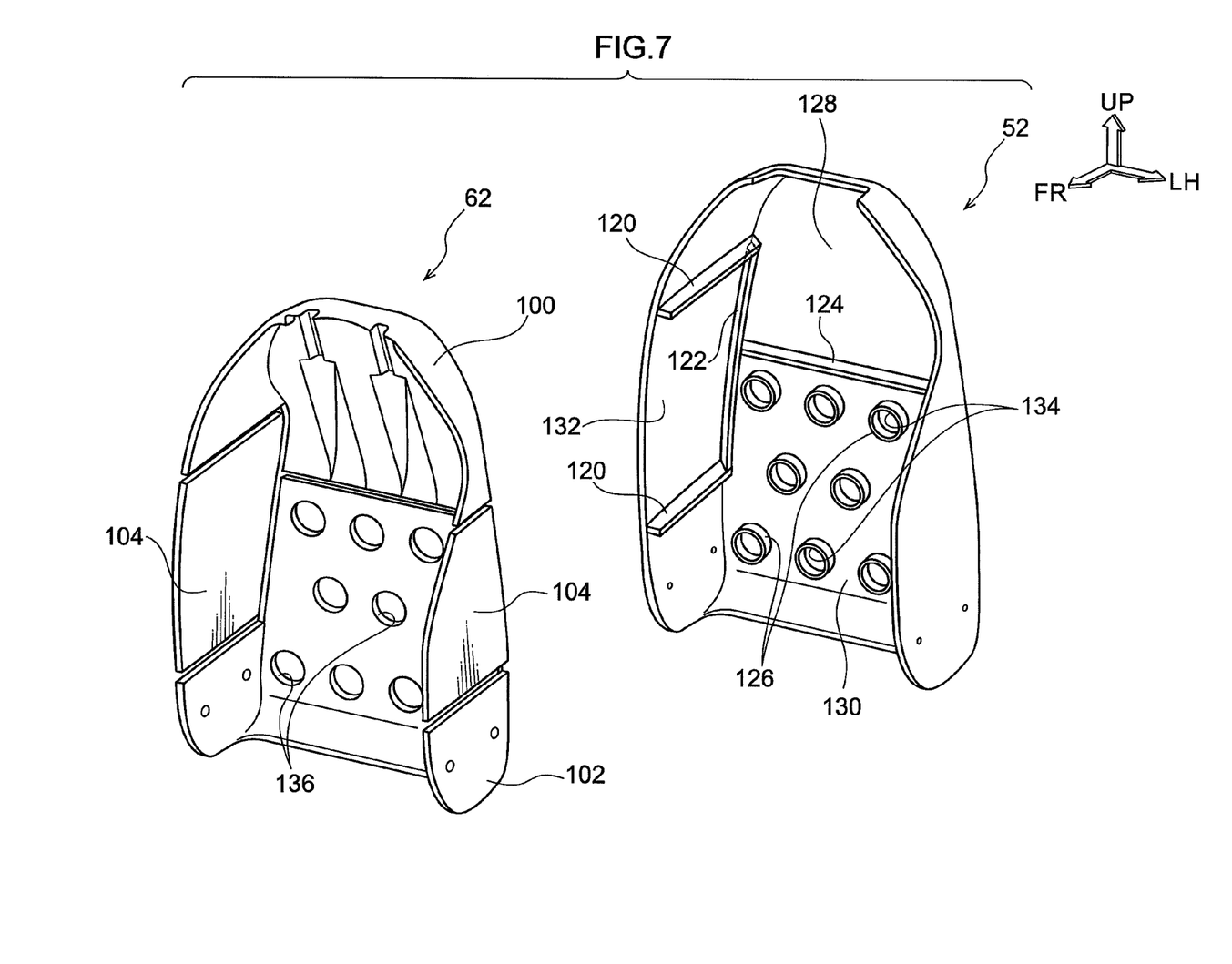
FIG. 7 is a perspective view illustrating a relationship between a second base member and a core section according to a third exemplary embodiment.

Explanation follows regarding the vehicle seat 10 according to a third exemplary embodiment, with reference to FIG. 7. Note that sections with similar configuration to the first exemplary embodiment and the second exemplary embodiment described above are appended with the same numerals, and explanation thereof is omitted.

In the third exemplary embodiment, rib sections 120, 122, 124, 126 are provided to the second base member 52.

To explain specifically, the rib sections 120, 122, 124, 126 all protrude out from the second base member 52, and leading end portions thereof abut the first base member 30. Note that the first base member 30 is omitted from FIG. 7 so that configuration of the rib sections 120, 122, 124, 126 is easier to understand.

The rib sections 120 are formed in rectangular plate shapes extending along the seat front-rear direction, and are disposed at positions separated at a specific interval from seat upper side end portions of the side wall sections 56, and at positions separated at a specific interval from seat lower side end portions of the side wall sections 56. The rib sections 122 are formed in rectangular plate shapes extending along the seat up-down direction, spanning across between end portions at the seat rear side of the rib sections 120. The rib section 124 formed in a rectangular plate shape spans across between seat up-down direction center portions of the rib sections 122.

The rib sections 126 are formed in circular cylindrical shapes, and are formed to the rear wall section 54 at plural locations. As an example, the rib sections 126 are disposed symmetrically with respect to a seat width direction center line of the second base member 52.

Note that in the present exemplary embodiment as an example, the rib sections 120, 122, 124, 126 are formed as part of the second base member 52 by injection molding; however a configuration may be applied in which the rib sections 120, 122, 124, 126 are configured as separate members and welded to the second base member 52. Moreover, the leading end portions of the rib sections 120, 122, 124, 126 may be joined to the first base member 30 by vibration welding or the like.

In the thus configured second base member 52, in the second process of the molding processes of the seatback shell 20, namely, in the process in which the upper mold 76 and the lower mold 70 are mated with each other, plural partitioned regions are formed between the upper mold 76 and the lower mold 70. Thus it may be understood that flow paths of the foaming liquids are formed by the rib sections 120, 122, 124, 126.

Specifically, a first partitioned region 128, partitioned by the rib sections 120, 122, 124, is formed at the seat upper side of the seatback shell 20. A second partitioned region 130, partitioned by the rib sections 120, 122, 124, is formed at the seat lower side of the seatback shell 20. Third partitioned regions 132, partitioned by the rib sections 120, 122, are formed at seat up-down direction center portions of the side shell sections 24. Plural small partitioned regions 134, partitioned by the rib sections 126, are formed inside the second partitioned region 130.

Note that in the molding processes of the seatback shell 20 of the present exemplary embodiment, foaming liquids each with different densities are injected from the injection nozzles 82, 84, 86 in the third process, similarly to in the second exemplary embodiment described above. Namely, the core section 62 is configured including the first foamed section 100, the second foamed section 102, and the third foamed section 104.

Operation and Advantageous Effects of Present Exemplary Embodiment

Explanation follows regarding operation and advantageous effects of the present exemplary embodiment.

In the present exemplary embodiment, the rib sections 120, 122, 124, 126 protrude out from the second base member 52, and the leading end portions of the rib sections 120, 122, 124, 126 abut the first base member 30. Thus the plural partitioned regions can be formed by the rib sections 120, 122, 124, 126 between the first base member 30 and the second base member 52. This enables the core section 62 to be partitioned by the rib sections 120, 122, 124, 126, and enables configuration of the core section 62 to be changed by partitioned region.

To explain specifically, low density foaming liquid is injected through the injection nozzles 82, forming the first foamed section 100 inside the first partitioned region 128. High density foaming liquid is injected through the injection nozzles 84, forming the second foamed section 102 inside the second partitioned region 130. Medium density foaming liquid is injected through the injection nozzles 86, forming the third foamed sections 104 at the third partitioned regions 132. Moreover, changing the shapes of the rib sections 120, 122, 124 in the present exemplary embodiment enables the placement locations of the first foamed section 100, the second foamed section 102, and the third foamed sections 104 to be freely set.

In the present exemplary embodiment, any one of the first partitioned region 128, the second partitioned region 130, or the third partitioned regions 132 may be configured as a space. Thus in the present exemplary embodiment, the rigidity distribution and balance of weight of the seatback shell 20 can be suitably set.

In the present exemplary embodiment, the plural small partitioned regions 134 partitioned by the rib sections 126 form thinned portions 136 of the core section 62. This enables the weight of the core section 62 to be reduced while adhering the first base member 30 and the second base member 52 to the core section 62. Thus the weight of the seatback shell 20 can be reduced while maintaining the rigidity of the seatback shell 20.

In addition, in the present exemplary embodiment, the rib sections 120, 122, 124, 126 may be used to reinforce the seatback shell 20.

Supplementary Explanation of the above Exemplary Embodiments (1) In the exemplary embodiments described above, the first base member 30 is configured provided with the first pass-through portions 46, the second pass-through portions 48, and the third pass-through portions 50; however the second base member 52 may be configured provided with the first pass-through portions 46, the second pass-through portions 48, and the third pass-through portions 50. Moreover, in cases in which the styling face at the seat rear side of the seatback 14 is configured by the second base member 52, similarly to in the exemplary embodiments described above, a configuration may be applied in which a cosmetic member is provided to cover the first pass-through portions 46, the second pass-through portions 48, and the third pass-through portions 50. The styling face at the seat rear side of the seatback 14 may also be configured by a separate member.

(2) In the exemplary embodiments described above, the rim portion 44 is configured formed to the first base member 30 and abuts the edge portion of the second base member 52; however, a rim portion may be configured formed to the second base member 52, or a configuration may be applied in which rim portions are not formed to either the first base member 30 or the second base member 52. Note that in cases of a configuration in which rim portions are not provided to the first base member 30 or the second base member 52, load applied to the seatback 14 can be absorbed by resilient deformation of the core section 62.

(3) In the exemplary embodiments described above, the first base member 30 and the second base member 52 are formed of nylon resin; however they may be formed of polypropylene resin or the like by carrying out surface treatment, etc. Note that a fiber reinforced thermoplastic elastomer resin sheet, a thermoplastic resin sheet, or the like may also be employed, depending on the shape and molding method of the first base member 30 and the second base member 52.

(4) In the exemplary embodiments described above, the rib sections 120, 122, 124, 126 are provided to the second base member 52; however the rib sections 120, 122, 124, 126 may be configured provided to the first base member 30.

(5) Configuration of the seatback shell 20 in the exemplary embodiments described above may also be applied as appropriate to the cushion pan, the cushion shell, etc. configuring the seat cushion 12. Configuration of the seatback shell 20 may also be applied to a vehicle seat in which the headrest and the seatback are formed as an integral unit.

What is claimed is:

1. A vehicle seat including a seatback frame comprising:
a first base member formed of a thin plate member made of resin;
a second base member formed of a thin plate member made of resin and disposed facing the first base member;
a pass-through portion that is formed to at least one of the first base member or the second base member, and that enables insertion of an injection nozzle for injecting a foaming liquid for a foamed body; and
a core section that is configured by the foamed body, that is disposed between the first base member and the second base member, and that is adhered to the first base member and the second base member, wherein:
the seatback frame comprises a back shell section and a pair of side shell sections;
the core section comprises a first foamed section, a second foamed section, and a third foamed section, having respective densities such that the second foamed section has a higher density than the third foamed section and the third foamed section has a higher density than the first foamed section;
the first foamed section is disposed further toward the seat upper side than a seat up-down direction center of the back shell section, and at the seat upper side of the side shell sections;
the second foamed section is disposed further toward the seat lower side than the seat up-down direction center of the back shell section, and at the seat lower side of the side shell sections; and
the third foamed sections are disposed at seat up-down direction center portions of the side shell sections.

2. The vehicle seat of claim 1, wherein:
the pass-through portion is configured including a first pass-through portion facing the first foamed section, and a second pass-through portion formed at a position separated from the first pass-through portion and facing the second formed section.

3. The vehicle seat of claim 1, wherein:
a plurality of partitioned regions are formed between the first base member and the second base member by a rib portion that protrudes out from at least one of the first base member or the second base member with a leading end portion of the rib portion abutting the other of the first base member or the second base member.

4. The vehicle seat of claim 3, wherein any of the partitioned regions from out of the plurality of partitioned regions forms a thinned portion of the core section.

5. The vehicle seat of claim 4, wherein the partitioned region that forms the thinned portion of the core section is formed by a rib section that is a cylindrical shape.

6. The vehicle seat of claim 1, wherein:
a portion further to the seat upper side than a seat up-down direction center portion of the first base member forms a sloped portion sloping from a seat front side toward a seat rear lower side;
a housing portion, in which headrest stays are to be housed, is formed to the sloped portion; and
the pass-through portion is disposed at a seat up-down direction center portion of the sloped portion.

7. A vehicle seat including a seatback frame comprising:
a first base member formed of a thin plate member made of resin;
a second base member formed of a thin plate member made of resin and disposed facing the first base member;
a pass-through portion that is formed to at least one of the first base member or the second base member, and that enables insertion of an injection nozzle for injecting a foaming liquid for a foamed body;
a core section that is configured by the foamed body, that is disposed between the first base member and the second base member, and that is adhered to the first base member and the second base member;
a back shell section; and
a pair of side shell sections, wherein
the pass-through portion is formed on an area corresponding to the pair of side shell sections of at least one of the first base member or the second base member, a portion further to a seat upper side than a seat up-down direction center portion of the first base member forms a sloped portion sloping from a seat front side toward a seat rear lower side; and a housing portion, in which headrest stays are to be housed, is formed to the sloped portion, and the pass-through portion is disposed at a seat up-down direction center portion of the sloped portion.

\* \* \* \* \*